United States Patent
Burugula et al.

(10) Patent No.: US 11,954,337 B2
(45) Date of Patent: Apr. 9, 2024

(54) ENCRYPTION MONITOR REGISTER AND SYSTEM

(71) Applicant: INTERNATIONAL BUSINESS MACHINES CORPORATION, Armonk, NY (US)

(72) Inventors: Ramanjaneya Sarma Burugula, Yorktown Heights, NY (US); Joefon Jann, Ossining, NY (US); Niteesh Kumar Dubey, Yorktown Heights, NY (US); Ching-Farn Eric Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/445,962

(22) Filed: Aug. 26, 2021

(65) Prior Publication Data
US 2023/0063792 A1 Mar. 2, 2023

(51) Int. Cl.
*G06F 3/06* (2006.01)
*G06F 12/10* (2016.01)
*G06F 12/1009* (2016.01)

(52) U.S. Cl.
CPC .......... *G06F 3/0623* (2013.01); *G06F 3/0619* (2013.01); *G06F 3/0659* (2013.01); *G06F 3/067* (2013.01); *G06F 12/1009* (2013.01)

(58) Field of Classification Search
CPC .... G06F 3/0623; G06F 3/0619; G06F 3/0659; G06F 3/067; G06F 12/1009
See application file for complete search history.

(56) References Cited

U.S. PATENT DOCUMENTS 9,514,309 B1 12/2016 Mann
10,387,648 B2 8/2019 Hirschberg
(Continued)

FOREIGN PATENT DOCUMENTS

CN 103955438 A 7/2014
CN 112287346 A * 1/2021
(Continued)

OTHER PUBLICATIONS

"Asymmetrically Encrypted Filesystems for Data Backup, Confidentiality, Disaster Recovery Restoration," Published May 3, 2006, IPCOM000136042D, https://priorart.ip.com/IPCOM/000136042.
(Continued)

*Primary Examiner* — Masud K Khan
(74) *Attorney, Agent, or Firm* — Rachel M. Yadlosky

(57) ABSTRACT

A method, a computer program product, and a system for initializing components to monitor for unauthorized encryptions of filesystem objects stored on a computing system. The method includes configuring an encryption monitor register to establish monitoring preferences of filesystem objects and allocating a predetermined size of persistent memory as a backup memory area for storing pre-encrypted versions of the filesystem objects. The method also includes inserting a starting address of the backup memory area in data bits of the encryption monitor register, and setting encryption monitor bits of page table entries in a hardware page table that correspond to at least one filesystem object, thereby establishing encryption monitoring of the filesystem object.

20 Claims, 7 Drawing Sheets

(56) References Cited

U.S. PATENT DOCUMENTS

| | | |
|---|---|---|
| 10,438,000 B1 | 10/2019 | Gu |
| 10,454,903 B2 | 10/2019 | Neal |
| 10,609,066 B1 | 3/2020 | Nossik |
| 10,623,438 B2 | 4/2020 | Sambandam |
| 10,783,043 B2 | 9/2020 | O'Mahony |
| 10,795,994 B2 | 10/2020 | Mehta et al. |
| 10,831,893 B2 | 11/2020 | Schmugar |
| 10,958,720 B2 | 3/2021 | Savino |
| 10,979,449 B2 | 4/2021 | Humphries |
| 2011/0004738 A1* | 1/2011 | Yasaki ............... G06F 21/6218 |
| | | 711/E12.001 |
| 2011/0173409 A1 | 7/2011 | Sibert |
| 2014/0096235 A1 | 4/2014 | Fryman et al. |
| 2017/0277898 A1* | 9/2017 | Powell ................. G06F 21/53 |
| 2018/0018458 A1 | 1/2018 | Schmugar |
| 2018/0248896 A1 | 8/2018 | Challita |
| 2018/0307435 A1 | 10/2018 | Van Riel et al. |
| 2019/0108340 A1 | 4/2019 | Bedhapudi et al. |
| 2019/0114438 A1* | 4/2019 | Hersans ............... G06F 21/602 |
| 2019/0347418 A1 | 11/2019 | Strogov |
| 2020/0051071 A1* | 2/2020 | Wu ..................... G06Q 20/401 |
| 2020/0092728 A1* | 3/2020 | Van Duyne ............ G06F 3/067 |
| 2020/0128027 A1 | 4/2020 | Hittel |
| 2020/0387609 A1 | 12/2020 | Hansen |
| 2021/0019411 A1 | 1/2021 | Schmugar |
| 2021/0049272 A1 | 2/2021 | Mueller-Wicke |
| 2021/0203504 A1* | 7/2021 | Brandt ................. H04L 9/3226 |
| 2021/0232685 A1 | 7/2021 | Kraemer |
| 2021/0255962 A1 | 8/2021 | Zmudzinski et al. |
| 2021/0334372 A1 | 10/2021 | Hansen |
| 2022/0060498 A1 | 2/2022 | Head, Jr. |
| 2022/0222345 A1 | 7/2022 | Mueller-Wicke |
| 2022/0269807 A1 | 8/2022 | Gehtman |
| 2023/0023584 A1 | 1/2023 | Sternfeld |
| 2023/0060606 A1 | 3/2023 | Dubey |
| 2023/0063792 A1 | 3/2023 | Burugula |

FOREIGN PATENT DOCUMENTS

| | | |
|---|---|---|
| EP | 3629540 A1 | 4/2020 |
| WO | 2007050797 A2 | 5/2007 |
| WO | 20181568001 W | 8/2018 |

OTHER PUBLICATIONS

"Cohesity: Counter Ransomware Attacks with Cohesity," https://www.cohesity.com/resource-assets/solution-brief/Counter-Ransomware-Attacks-with-Cohesity.pdf.

"Ensuring the accessibility of the system for disaster recovery without downtime," Published Apr. 13, 2016, IPCOM000245837D, https://priorart.ip.com/IPCOM/000245837.

"Inline cyber resiliency for async replication in a three-site replication," published Nov. 8, 2019, IPCOM000260259D, https://priorart.ip.com/IPCOM/000260259.

"Methodology for Optimizing Clustered Filesystem Asynchronous Replication Suited for Cyber Resiliency," published Sep. 7, 2020, IPCOM000263515D, https://priorart.ip.com/IPCOM/000263515.

"Pure FlashBlade with Commvault for Data Protection," Published Dec. 2020, https://whitepapers.theregister.com/paper/view/10332/pure-flashblade-with-commvault-for-data-protection.

D. Min et al., "Amoeba: An Autonomous Backup and Recovery SSD for Ransomware Attack Defense," in IEEE Computer Architecture Letters, vol. 17, No. 2, pp. 245-248, Jul. 1-Dec. 2018, doi: 10.1109/LCA.2018.2883431.

E. Berrueta, D. Morato, E. Magana and M. Izal, "A Survey on Detection Techniques for Cryptographic Ransomware," in IEEE Access, vol. 7, pp. 144925-144944, 2019, doi: 10.1109/ACCESS.2019.2945839.

FBI Flash: Latest Tactics, Techniques, and Procedures Associated with Ryuk Ransomware and Recommended Mitigation, https://iacc.memberclicks.net/assets/docs/COVID19/RYUK_FBI_FLASH_FINAL.PDF.

Jian Huang, Jun Xu, Xinyu Xing, Peng Liu, and Moinuddin K. Qureshi. 2017. FlashGuard: Leveraging Intrinsic Flash Properties to Defend Against Encryption Ransomware. In <i>Proceedings of the 2017 ACM SIGSAC Conference on Computer and Communications Security</i> (<i>CCS '17</i>). Association for Computing Machinery, New York, NY, USA, 2231-2244. DOI:https://doi.org/10.1145/3133956.3134035.

Kok, S.H.; Abdullah, A.; Jhanjhi, N.; Supramaniam, M. Prevention of Crypto-Ransomware Using a Pre-Encryption Detection Algorithm. Computers 2019, 8, 79. https://doi.org/10.3390/computers8040079.

List of IBM Patents or Patent Applications Treated as Related, 2 pages.

S. Kumar Sen, N. Chourey, "A Study of Ransomware Detection and Prevention at Organizations", International Research Journal of Engineering and Technology, Jul. 2020, https://www.irjet.net/archives/V7/17/IRJET-V7I7810.pdf.

S. Mahmudha Fasheem, P. Kanimozhi, and B. AkoraMurthy, "Detection and Avoidance of Ransomware", International Journal of Engineering Development and Research, vol. 5, Issue 1, 2017, https://www.ijedr.org/papers/IJEDR1701090.pdf.

Baek, S. et al., "SSD-Insider: Internal Defense of Solid-State Drive against Ransomware with Perfect Data Recovery," 2018 IEEE 38th International Conference on Distributed Computing Systems (ICDCS), Vienna, Austria, 2018, pp. 875-884, doi: 10.1109/ICDCS.2018.00089. (Year: 2018).

PCT/EP2022/070596 International Search Report and Written Opinion dated Oct. 25, 2022, 11 pgs.

PCT/IB2022/057056 International Search Report and Written Opinion dated Oct. 26, 2022, 9 pgs.

Sternfeld, "Systems and Methods for Ransomware Detection", U.S. Appl. No. 63/203,505, filed Jul. 2021. (Year: 2021).

Notice of References U.S. Appl. No. 17/445,963, dated Aug. 3, 2023.

* cited by examiner

| PTE Encryption Monitor Bit 410 | PTE Encryption Status Bit 420 | ... | Virtual Page # 430 | Physical Frame # 440 |
|---|---|---|---|---|
| ... | ... | ... | ... | ... |
| ... | ... | ... | ... | ... |
| ... | ... | ... | ... | ... |

FIG. 4

ENCRYPTION MONITOR REGISTER AND SYSTEM

BACKGROUND

The present disclosure relates to encryption monitoring of filesystem objects, and more specifically, to monitoring filesystem objects using an encryption monitor register to prevent unauthorized encryptions such as ransomware attacks.

Ransomware is malware that can prevent users from accessing their computing device resources and/or personal data using various methods. Typically, when a system is affected by a ransomware attack, the computing device will display a ransom note and provide a way to pay the ransom. The data on the computing device (e.g., a computer, server, tablet, smartphone, Internet of Things (IoT) device) becomes unusable until the device owner pays a ransom to remove the restriction. The perpetrators behind the ransomware can collect ransom money using anonymous payment methods (e.g., prepaid cash cards, cryptocurrencies) to limit any potential money trails.

Computer registers are quickly accessible locations available to a processor's central processing unit. Registers can include a small amount of fast storage, provide specific hardware functions, and can be read-only or write-only. Typically, computers load data from a larger memory into registers used for arithmetic operations and are manipulated or tested by machine instructions. The manipulated data can then be stored back in the main memory.

SUMMARY

Embodiments of the present disclosure include a system for monitoring for unauthorized encryptions performed on filesystem objects. The system includes a memory, a processor, local data storage having stored thereon computer-executable code. The computer-executable code includes the program instruction executable by a processor to cause the processor to perform the methods described below. The system also includes an encryption monitor register including controls bits to establish encryption monitoring of filesystem objects and a hardware page table including page table entry ("PTE") encryption monitor bits and PTE encryption status bits for page table entries of the filesystem objects. The system further includes a backup memory area including a data region for storing pre-encrypted versions of the filesystem objects marked for encryption monitoring and an initializer configured to set the control bits in the encryption monitor register, enable encryption monitoring of the filesystem objects by setting the encryption monitor bits in the hardware page table, and is further configured to allocate the backup memory area.

Additional embodiments of the present disclosure include a computer-implemented method for initializing components to monitor unauthorized encryptions of filesystem objects stored on a computing system. The computer-implemented method includes configuring an encryption monitor register to establish monitoring preferences of filesystem objects and allocating a predetermined size of persistent memory as a backup memory area for storing pre-encrypted versions of the filesystem objects. The computer-implemented method also includes inserting a starting address of the backup memory area in data bits of the encryption monitor register and setting PTE encryption monitor bits of page table entries in a hardware page table that correspond to at least one filesystem object, thereby establishing encryption monitoring of the filesystem object.

Additional embodiments of the present disclosure include a computer program product for initializing components to monitor unauthorized encryptions of filesystem objects stored on a computing system, one or more computer-readable storage medium, and program instructions stored on the one or more computer-readable storage media, the program instruction executable by a processor to cause the processor to perform a method. The method includes configuring an encryption monitor register to establish monitoring preferences of filesystem objects and allocating a predetermined size of persistent memory as a backup memory area for storing pre-encrypted versions of the filesystem objects. The method also includes inserting a starting address of the backup memory area in data bits of the encryption monitor register and setting PTE encryption monitor bits of page table entries in a hardware page table that correspond to at least one filesystem object, thereby establishing encryption monitoring of the filesystem object. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

FIG. 4 is a block diagram illustrating a hardware page table used by one or more embodiments of the present disclosure.

Figure 1:
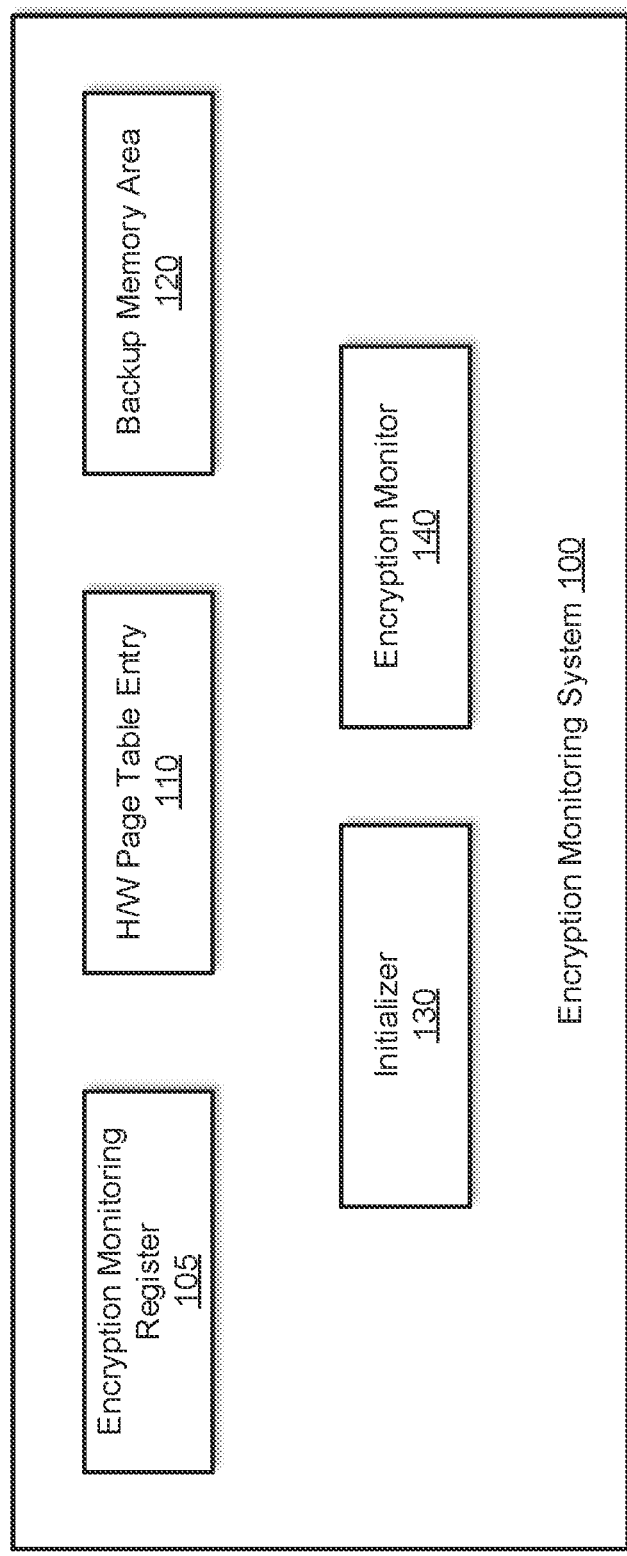
FIG. 1 is a block diagram illustrating an encryption monitoring system used by one or more embodiments of the present disclosure.

While the present disclosure is amenable to various modifications and alternative forms, specifics thereof have been shown by way of example in the drawings and will be described in detail. It should be understood, however, that the intention is not to limit the embodiments described. On the contrary, the intention is to cover all modifications, equivalents, and alternatives falling within the scope of the

DETAILED DESCRIPTION

The present disclosure relates to encryption monitoring of filesystem objects, and more specifically, to monitoring filesystem objects against unauthorized encryptions, such as ransomware attacks. While the present disclosure is not necessarily limited to such applications, various aspects of the disclosure may be appreciated through a discussion of various examples using this context.

There are two main types of ransomware techniques that are employed. These types are locker and crypto-ransomware. Locker ransomware works by preventing users from reaching their personal files by denying them access to certain computing resources (e.g., locking the desktop or preventing a login) and then demanding a ransom to regain access. Typically, these types of attacks can be overcome by technical users with relative ease.

Crypto ransomware encrypts data stored on a target machine, preventing a user from accessing that data. The attacker keeps the data encrypted until the user pays the ransom and obtains the key from the attacker. In order to incentivize users to pay the ransom, some attackers may progressively delete files or release them to the public if the user fails to pay the ransom within a certain time frame.

Various techniques are used to protect against ransomware attacks. Typically, corporations and governments deploy firewalls within a network to isolate networks. The isolated networks safeguard data and applications to avoid the risk of a ransomware attack. However, most enterprises and government agencies allow employees remote access to their internal network. This makes securing networks using firewalls difficult and susceptible to attacks as intruders can surpass the defenses by infecting endpoint devices directly. Other standard protection techniques include patch management, physical security of digital assets, network segmentation, anti-ransomware products, utilization of least-privilege accounts, vulnerability scanning tools, intrusion detection/prevention systems, and the like.

Current protection systems, such as intrusion detection systems (IDS) and intrusion prevention systems (IPS), utilize hardware devices with software components or be deployed as software applications. Both IDSs and IPSs can scan network traffic for signatures that match a database of known cyberattack signatures. Typically, IDSs are either network-based or host-based. Network-based IDSs can be configured to monitor network traffic. A host-based IDS can be installed on an end device to monitor the state of a system actively (e.g., file integrity checks, log analysis, process monitoring, Windows registry monitoring, detecting malicious software, etc.). The host-based IDS can also monitor the network traffic passing through its network interfaces. Once an attack is detected, the IDS can send a notification so that another system, or administrator, can perform preventative actions such as closing the attack entry point or reconfiguring the firewall.

IPSs operate similarly to an IDS in monitoring network traffic but respond differently when suspicious activity is detected. IPSs can use deep packet inspection to monitor network traffic for suspicious activity proactively and can take preventative action automatically to deter the attack. IPSs can act as control systems that prevent and allow packet delivery using a predefined policy.

However, limitations on ransomware protection remain as current techniques rely on cyberattack signature databases containing known attack patterns and protocol anomalies. The cyberattack signature databases require periodic updates to prevent newly discovered cyber threats from intruding a system. Thus, current ransomware protection techniques do not protect against new ransomware cyberattacks because those attacks may not have known attack patterns. Additionally, a system can become vulnerable if any of the additional security functions (e.g., antivirus, web filtering, content filtering, data leak prevention, firewalls, etc.) becomes compromised or fails to update in a timely manner.

Embodiments of the present disclosure may overcome the above and other problems by using an encryption monitoring system that utilizes modified hardware page table entries, a backup memory area, and an encryption monitor register to monitor for hardware-based encryptions occurring to pages of an operating system or hypervisor. Upon initialization, the encryption monitor register can be set to indicate to the hardware components the location of the backup memory area and the actions it is required to take. During initialization, the data bits of the register are set to point to the location of the backup memory area, and control bits are set that dictate the actions the system takes during the monitoring process. In addition to providing a mapping between virtual addresses of a page and addresses of physical frames of a page, the hardware page table entries can include a PTE encryption monitor bit and a PTE encryption status bit for each page. These bits can indicate which filesystem objects require encryption monitoring and when encryption operations occur to these objects. Once allocated, the backup memory area can store pre-encrypted backups of the filesystem objects being monitored when an encryption activity is detected.

Additionally, the backup memory area can be set such that it is only accessible by trusted and secure software in the system. Encryption operations, such as a ransomware attack, can be detected whenever hardware-based encryption is initiated on a monitored filesystem object. The PTE encryption status bits in the hardware page table can be set to indicate that encryption is about to occur to those pages. If encryption is detected, the encryption monitoring system can store a pre-encrypted version of the filesystem object in the backup memory area.

More specifically, the encryption monitoring system provides hardware features to a computing system that can monitor for encryptions (e.g., hardware features like processor instructions, encryption accelerators, and known encryption libraries of the system software). The hardware features can monitor pages of an operating system or hypervisor and implement mitigation techniques such as storing pre-encrypted data in a secure area that can be used as a backup when filesystem objects are encrypted.

In some embodiments, the encryption monitor register includes data bits and controls bits that are set upon initialization to monitor for encryption. The data bits can be used to specify the location and calculate the starting address of the backup memory area. The control bits include an encryption monitor enable bit, a memory backup area bit, and an encryption count enabling bit. The encryption monitor bit can instruct the system to monitor for encryption when set. The backup memory area bit can instruct the system to utilize the backup memory area specified by the data bits. The encryption count enable bit can instruct the system to increment an encryption count whenever encryption occurs to a page.

In some embodiments, the hardware page table entry includes a PTE encryption monitor bit and a PTE encryption status bit. The PTE encryption monitor bit, which is set when a filesystem object is marked for encryption monitoring, can indicate to the hardware that a page is has to be monitored for encryption. When a filesystem object is marked for encryption monitoring, the corresponding page table entries of that object can set the encryption monitor bit to be used as an indicator for the monitoring. The PTE encryption status bit, which is set by the hardware upon detection of an encryption operation to a page table entry, indicates that encryption activity is occurring on the page table entry and that a pre-encrypted version of that data is copied to the backup memory area.

In some embodiments, the backup memory area includes a metadata region and a data region. The metadata region can include information such as the size of the backup memory area, the size of the available space in the backup memory area, a starting address of the available space in the backup memory area, and a hash table. The hash table can contain a mapping between physical page numbers and backup memory locations relating to data stored in the backup memory area. An administrator can configure the backup memory area to set the area's initial size and security restrictions for the backup memory area. For example, the backup memory area can be configured such that the backup memory area is only accessible by trusted software in the system.

In some embodiments, the backup memory area is governed a retention period policy. The retention period policy can dictate how long pre-encrypted data is stored on the data region of the backup memory area before being deleted. This prevents data from being stored in the backup memory area unnecessarily and helps to ensure that the backup memory area has available space when needed. For example, the retention period policy may indicate that data can only be stored for four days. After the four-day period, any data stored for that amount of time is removed, thereby clearing space for other data.

FIG. 1 illustrates an encryption monitoring system 100 configured to initialize and monitor unauthorized encryptions such as ransomware attacks, in accordance with embodiments of the present disclosure. The encryption monitoring system 100 includes an encryption monitor register 105, hardware page table entry 110, a backup memory area 120, an initializer 130, and an encryption monitor 140. Additional details of the encryption monitor register 105 are presented in FIG. 2, additional details of the hardware page table 110 are presented in FIG. 4, and additional details of the backup memory area 120 are presented in FIG. 3.

The encryption monitor register 105 is a component of the encryption monitoring system 100 configured to monitor for encryption of pages of an operating system or hypervisor. The encryption monitor register 105 can also maintain a starting address of the backup memory area 120. An additional description of the encryption monitor register 105 is presented in FIG. 2.

The hardware page table 110 is a component of the encryption monitoring system 100 configured to store page table entries. Each page table entry in the hardware page table 110 can include an encryption monitor bit indicating whether the page table entry should be monitored for encryption or not. Each page table entry in the hardware page table 110 can also include an encryption status bit that can be marked when encryption occurs to that page table entry. An additional description of the hardware page table entry 110 is presented in FIG. 4.

The backup memory area 120 is a component of the encryption monitoring system 100 configured to store pre-encrypted data and additional information relating to encryption processes. The backup memory area 120 can include a metadata region and a data region. The metadata region can provide information such as the overall size and remaining space of the backup memory area 120. The data region can be reserved for pre-encrypted data that requires storing during an encryption event. An additional description of the backup memory area is presented in FIG. 3.

The initializer 130 is a component of the encryption monitoring system 100 configured to initialize and configure hardware components maintained by the encryption monitoring system 100. The initializer 130 can set the control bits of the encryption monitor register 105 in a configuration predetermined by an administrator. For example, the initializer 130 can set the encryption monitor bit based on whether to enable or disable encryption monitoring. The initializer 130 can also set the backup memory area bit based on whether to update the backup memory area 120 location for future encryption operations. The initializer 130 can also set the encryption count bit based on whether to maintain an encryption count when multiple encryption operations occur on a single physical memory page.

The initializer 130 is further configured to allocate and establish the backup memory area 120. The initializer 130 can allocate a predetermined size of persistent memory as the backup memory area 120 that can then be used for storing pre-encrypted versions of the filesystem objects. The starting address of that persistent memory can then be placed into the data bits of the encryption monitor register 105.

The encryption monitor 140 is a component of the encryption monitoring system 100 configured to monitor encryptions and store pre-encrypted data in the backup memory area 120. When the encryption monitor 140 detects an encryption operation, several actions occur before the encryption operation is permitted to execute. The encryption monitor 140 can check the control bits of the encryption monitor register 105, page table entry bits, and a hash table stored in a metadata region of the backup memory area 120 to determine what measures to take. For example, suppose the encryption monitor bit is set, the PTE encryption monitor bit in a page table entry of a virtual page being encrypted is set, the PTE encryption status bit is not set, and the hash table in the backup memory area 120 does not have an entry for the physical page frame. In that case, a pre-encrypted version of the filesystem object that is about to be encrypted will be placed into the backup memory area 120. Once backup of a pre-encrypted page is performed, the encryption monitor 140 can also set the PTE encryption status bit of that page. Additionally, if the physical page already copied into the backup memory area 120 during a prior encryption, and the encryption count bit is set, then the encryption monitor 140 can increment an encryption count.

It is noted that FIG. 1 is intended to depict the major representative components of an encryption monitoring system 100. In some embodiments, however, individual components may have greater or lesser complexity than as represented in FIG. 1, components other than or in addition to those shown in FIG. 1 may be present, and the number, type, and configuration of such components may vary.

Figure 2:
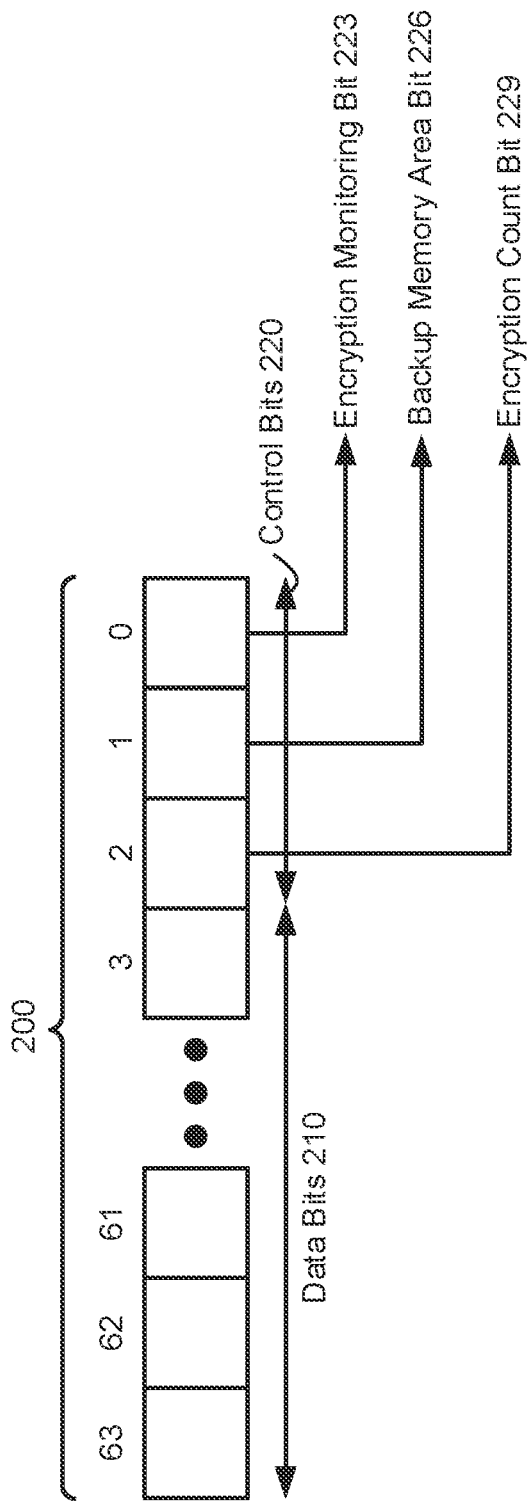
FIG. 2 is a block diagram illustrating an encryption monitor register used by one or more embodiments of the present disclosure.

FIG. 2 is a block diagram illustrating an encryption monitor register 200 (which can be the same as, or substantially similar to, the encryption monitor register 105 of FIG. 1), in accordance with embodiments of the present disclosure. The encryption monitor register 200 includes data bits 210 and controls bits 220. The control bits include an encryption monitor bit 223, a backup memory area bit 226, and an encryption count bit 229.

The encryption monitor register 200 can be used to accept, store, and transfer data and instructions used by a central processing unit. The encryption monitor register 200 can be in the form of an accumulator, a data register, an address register, a program counter, a memory data register, an index register, a memory buffer register, and the like. Additionally, the encryption monitor register 200 can be used for several commands such as fetch, decode and execute commands.

The data bits 210 are components of the encryption monitor register 200 configured to store and calculate the starting address of a backup memory area that is used to store pre-encrypted data. As an example, as shown, bits 3-63 are designated as the data bits 210. However, the data bits 210 can vary based on the architecture and register used during implementation.

The control bits 220 are components of the encryption monitor register 200 configured to indicate encryption commands. The encryption monitor bit 223 can indicate whether encryption monitoring is enabled. For example, when the encryption monitor bit 223 is set '0', then encryption monitoring is not enabled. When the encryption monitor bit 223 is set to '1', then encryption monitoring is enabled. In some embodiments, the indicator bit is reversed, such that '0' indicates monitoring and '1' indicates no monitoring.

The backup memory area bit 226 can indicate whether the system should update the backup memory area 120 location to the address indicated by the data bits 210. For example, when the backup memory area bit 226 is set '0', then the system does not update the backup memory location. Instead, the system ignores the data bits and continues to use the address that was previously registered. When the backup memory area bit 226 is set to '1', that indicates to the system to utilize the backup memory area pointed to by the data bits 210 when storing pre-encrypted data. When this control bit is set to '1', and the data bits are set to a certain predetermined value (e.g., 0x0000 . . . 0), it can be an indication to the system that the backup memory area 120 should not be initialized. In some embodiments, the indicator bit is reversed, such that '0' indicates to the system to utilize the backup memory area pointed to by the data bits 210, and '1' indicates not to utilize the backup memory area.

The encryption count bit 229 can indicate the type of encryption count technique to use when determining an encryption speed. For example, when the encryption count bit 229 is set '1', then the system can utilize the hash table encryption count stored in the backup memory area. The encryption count in the hash table can be incremented each time a virtual page is encrypted. When the encryption count bit 229 is set to '0', that indicates to the system to not utilize the hash table encryption count. The PTE encryption status bit in the hardware page table entry is set whenever the page is encrypted. In some embodiments, the indicator bit is reversed, such that '0' indicates to the system to utilize the hash table encryption count when determining the encryption speed, and '1' indicates not to utilize the hash table encryption count.

It is noted that FIG. 2 is intended to depict the major representative components of an encryption monitor register 200. In some embodiments, however, individual components may have greater or lesser complexity than as represented in FIG. 2, components other than or in addition to those shown in FIG. 2 may be present, and the number, type, and configuration of such components may vary.

Figures 3A, 3B:
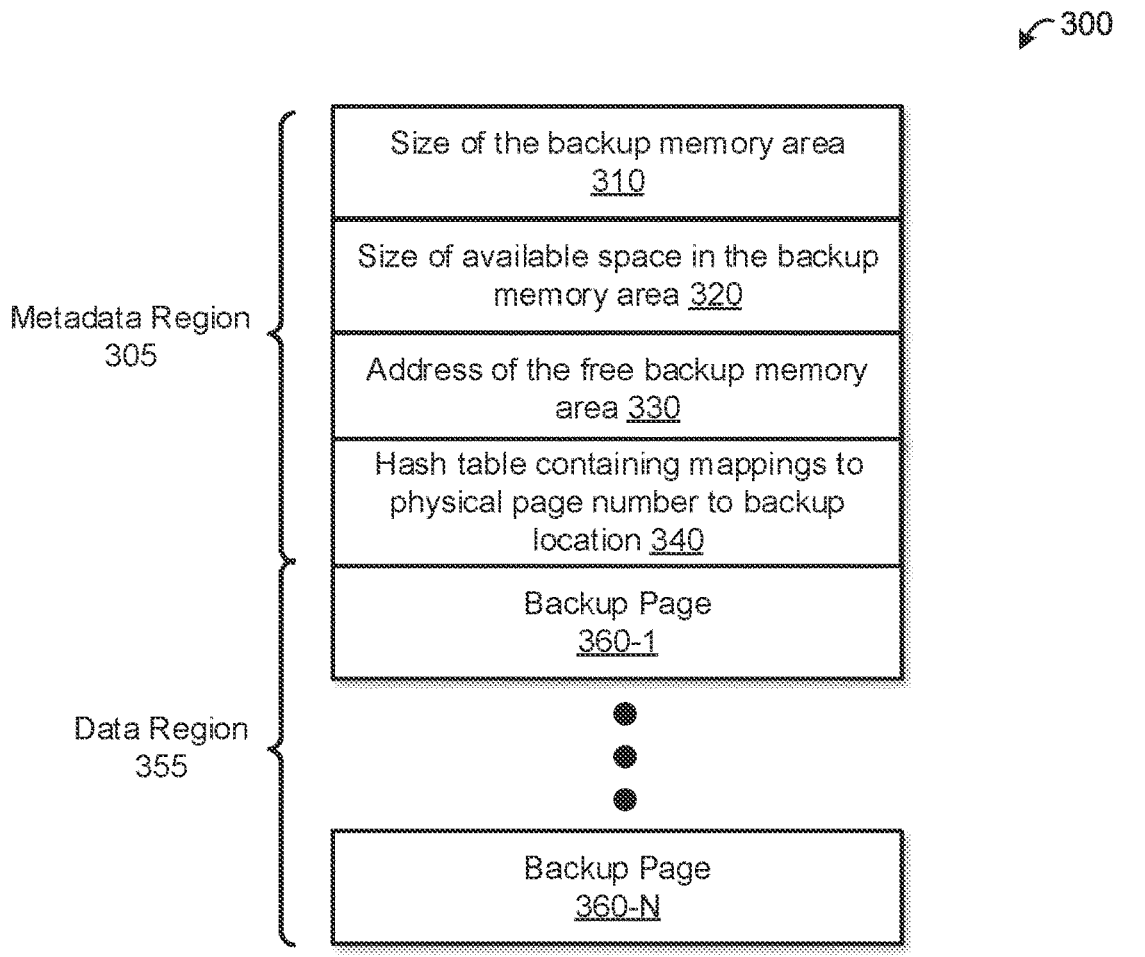
FIG. 3A is a block diagram illustrating a backup memory area used by one or more embodiments of the present disclosure.
FIG. 3B is a block diagram illustrating a hash table within the metadata region of the backup memory area and used by one or more embodiments of the present disclosure.

FIG. 3A is a block diagram illustrating a backup memory area 300 (which can be the same as, or substantially similar to, the backup memory area 120 of FIG. 1) configured to store pre-encrypted data and provide additional information relating to encryption processes, in accordance with embodiments of the present disclosure. The backup memory area 300 includes a metadata region 305 and a data region 355. The metadata region 305 includes a total size 310 of the backup memory area, a size of available space 320 in the backup memory area, a starting address 330 of the free backup memory area, and a hash table 340. The data region 355 includes a backup page 360-1 and a backup page 360-N(collectively "backup pages 360"), where N is a variable integer representing any number of possible backup pages 360.

The backup memory area 300 can be predetermined based on the number of filesystem objects being monitored for encryption. In some embodiments, the backup memory area 300 is the same size as the total number of encryption file objects being monitored. For example, suppose the size of the filesystem objects being monitored is two gigabytes. In that case, the backup memory area 300 can be set such that the pre-encrypted versions of those files can all be stored in the backup memory area 300 at the same time. This prevents issues that may arise when the backup memory area 300 lacks the necessary space to store the pre-encrypted data. In some embodiments, the total size 310 of the backup memory area 300 is adjusted dynamically. For example, if the available space 320 of the backup memory area 300 reaches a predetermined percentage threshold (e.g., 50%, 60%, 90%), then the total size 310 can be increased to accommodate for additional pre-encrypted data without risking the backup memory area 300 running out of available space.

In some embodiments, alleviations measures are performed on the backup memory area 300 when the data region 355 lacks space to store a pre-encrypted filesystem object. The alleviation measures include, for example, removing pre-encrypted objects stored in the data region 355 beyond their retention period and allocating additional memory to the backup memory area 300. The alleviation measures can be implemented when a determination is made that the backup memory area 300 is unable to store a pre-encrypted backup of a filesystem object. A notice can be can generated that instructs the system that an alleviation measure is required.

In some embodiments, the backup memory area 300 can only be accessed by certain software. For example, access restrictions can be set on the backup memory area 300 such that only trusted software given access to the backup memory area 300 can access the stored pre-encrypted data. By doing so, the backup memory area 300 becomes less susceptible to falling victim to the ransomware attack that it seeks to prevent. The trusted software can be set at initialization and can be limited to software that potential attackers cannot access.

When storing pre-encrypted data into the data region 355, the software can refer to the starting address 330 of the free space and determine whether the pre-encrypted data can be stored within the remaining available space 320. If there is available space 320, then the pre-encrypted data is stored. However, suppose there is not enough space available to store the pre-encrypted data. In that case, a hardware interrupt can be initiated to inform the software that the backup memory area 300 lacks space and that a remediation technique needs to be employed.

FIG. 3B is a block diagram illustrating the hash table 340 configured to store information relating to the pre-encrypted data stored in the data region 355 of the backup memory area 300. The hash table 340 includes columns for a physical page frame number 341, a backup location 342, and an encryption count 343. The hash table also includes hash table entry 345-1, 345-N (collectively "hash table entries 345") where N is a variable integer representing any number of possible hash table entries 345. For each physical page stored in the data region 355, a hash table entry 345 includes a key and a value that can be set. The key can represent a page frame number 341 for an object and a value representing the backup memory location 342 of that page frame. Additionally, the value can include an encryption count 343. The encryption count 343 can be used by the system software when determining an encryption speed. Whenever encryption occurs to a virtual page of an object marked for monitoring, if the encryption count bit 229 is set, then the encryption count is incremented for the physical page frame corresponding to that virtual page in the hash table.

It is noted that FIGS. 3A and 3B are intended to depict the major representative components of a backup memory area 300. In some embodiments, however, individual components may have greater or lesser complexity than as represented in FIGS. 3A and 3B, components other than or in addition to those shown in FIGS. 3A and 3B may be present, and the number, type, and configuration of such components may vary.

FIG. 4 is a block diagram illustrating a hardware page table 400 (which can be the same as, or substantially similar to, the hardware page table 110 of FIG. 1) for use by a virtual memory system to store a mapping between virtual addresses and physical addresses, in accordance with embodiments of the present disclosure. The hardware page table 400 includes a PTE encryption monitor bit 410, a PTE encryption status bit 410, a virtual page number 430, a physical frame number 440, and a page table entry 450-1, 450-1 (collectively "page table entries 450") where N is a variable integer representing any number of possible page table entries 450.

The PTE encryption monitor bit 410 is a component of the hardware page table entries 450 configured to indicate to the hardware that a page requires monitoring for encryption. Whenever a filesystem object is marked for encryption monitoring, its corresponding page table entries in the hardware page table 400 can also be marked for encryption monitoring. This can be done by setting the encryption monitor bits 410 to '1' to indicate the monitoring of those pages. The pages of filesystem objects that are not monitored can maintain their encryption monitor bits 410 at '0'.

The PTE encryption status bit 410 is a component of the hardware page table entries 450 configured to indicate that encryption was performed on a page to the system software. Additionally, if the PTE encryption status bit 410 can also indicate that the corresponding pre-encrypted data was copied to the backup memory area 300 if the PTE encryption monitor bit 410 is set for monitoring. When the PTE encryption status bit 420 is set to '1' it indicates to the system software that encryption to the data relating to that page entry has occurred. The PTE encryption status bit 420 is set to '0' to indicate that no encryption has occurred on the virtual page represented by that PTE. In some embodiments, the bit indication is reversed, such that '0' indicates to the system software that encryption has occurred on the data relating to the page table entry, and '1' indicates that no encryption has occurred.

The hardware page table 400 can operate as a typical page table operates but with the addition of the PTE encryption monitor bit 410 and the PTE encryption status bit 420. The hardware page table 400 allows an operating system to keep track of which virtual pages 430 points to which physical frames 440. Additionally, the hardware page table 400 can be in the form of various types of page tables. These forms include, but are not limited to, inverted page tables, multi-level page tables, virtualized page tables, and nested page tables.

It is noted that FIG. 4 is intended to depict the major representative components of a hardware page table 400. In some embodiments, however, individual components may have greater or lesser complexity than as represented in FIG. 4, components other than or in addition to those shown in FIG. 4 may be present, and the number, type, and configuration of such components may vary.

Figure 5:
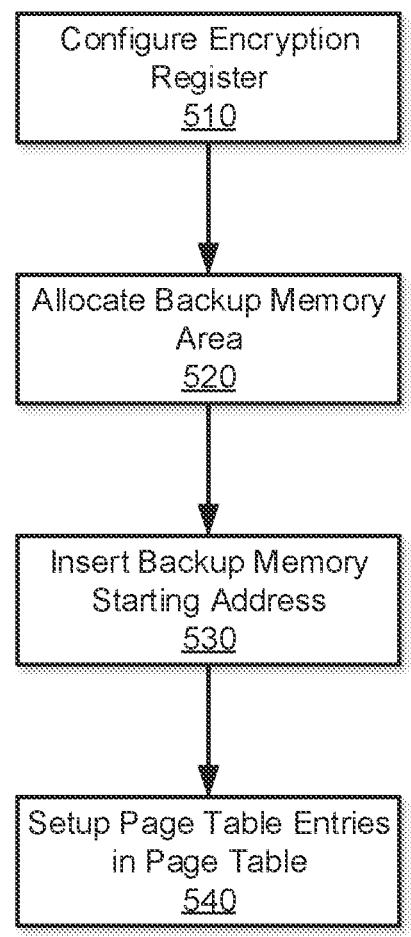
FIG. 5 is a flow diagram illustrating a process of initializing components to monitor for unauthorized encryptions performed in accordance with embodiments of the present disclosure.

FIG. 5 is a flow diagram illustrating a process 500 of initializing hardware components for encryption monitoring, in accordance with embodiments of the present disclosure. The process 500 may be performed by hardware, firmware, software executing on a processor, or a combination thereof. For example, any or all the steps of the process 500 may be performed by one or more processors embedded in a computing device. The initializer 130 configures the encryption monitor register 105 that establishes encryption monitoring preferences for filesystem objects. This is illustrated at step 510.

During configuration, the initializer 130 can set the control bits of the encryption monitor register 105. The encryption monitor bit 223 can be set to indicate whether encryption monitoring is enabled. The backup memory area bit 226 can be set to indicate whether the system should use the backup memory area indicated by the data bits 210. The encryption count bit 229 can be set to indicate the type of encryption count technique to use when determining an encryption speed.

The initializer 130 allocates a predetermined size of persistent memory as the backup memory area 300 that can be used for storing pre-encrypted versions of filesystem objects. This is illustrated at step 520. The backup memory area 300 can include a metadata region 305 and a data region 355. The metadata region 305 can include a total size 310 of the backup memory area, a size of available space 320 in the backup memory area, a starting address 330 of the free backup memory area, and a hash table 340. The hash table 340 can store information relating to the pre-encrypted data stored in the data region 355 of the backup memory area 300. For each object stored in the data region 355, a key and a value can be set. The key can represent a page frame number for an object and a value representing the backup memory location of the object. Additionally, the value can include an encryption count. Once allocated, the initializer 130 inserts a starting address of the backup memory area 300 in the data bits of the encryption monitor register 200.

The page table entries of filesystem objects mark for encryption monitoring are set up for monitoring. This is illustrated at step 540. Whenever a filesystem object is marked for encryption monitoring, its corresponding page table entries in the hardware page table 400 can also be marked for encryption monitoring. This can be done by setting the encryption monitor bits 410 to '1' to indicate the monitoring of those pages. The pages of filesystem objects that are not monitored can maintain their encryption monitor bits 410 at '0'.

Figure 6:
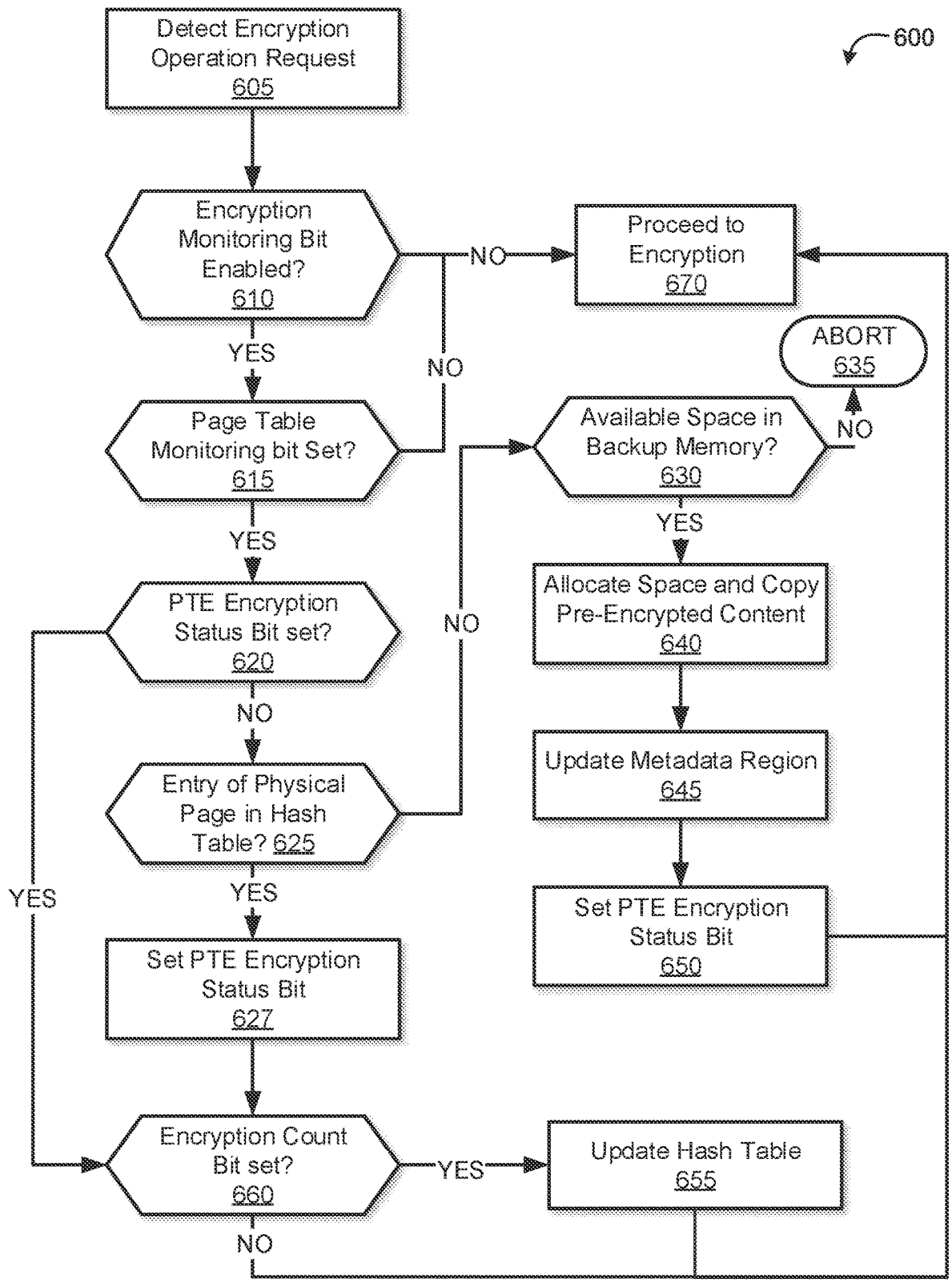
FIG. 6 is a flow diagram illustrating a process of detection and response to encryption operations and performed in accordance with embodiments of the present disclosure.

FIG. 6 is a flow diagram illustrating a process 600 of detection and response to encryption, in accordance with embodiments of the present disclosure. The encryption monitor 140 detects an encryption operation request on a page table entry. This is illustrated at step 605. The encryption operation, or encryption activity, can be a result of an action performed by hardware features such as a processor instruction, use of an encryption accelerator, or use of known encryption libraries useable by the system. The encryption activity can be directed to page table entries of an operating system or hypervisor that are monitored by the encryption monitoring system 100.

Once detected, the encryption monitor 140 determines whether the encryption monitor bit 223 in the encryption monitor register 200 is set as enabled or not. If the encryption monitor bit 223 is not enabled, then the process 600 proceeds to step 670 and allows the encryption procedure to occur. However, if the encryption monitor bit 223 is enabled, the process 600 proceeds to step 615.

If the encryption monitor bit 223 is enabled, then the encryption monitor 140 determines whether the PTE encryption monitor bit 410 for the page table entry 450 is set as enabled. This is illustrated at step 615. The PTE encryption monitor bit 410, when set as enabled, indicates to the encryption monitoring system 100 that a filesystem object and its corresponding page table entries require encryption monitoring. If the PTE encryption status bit 410 is not set as enabled, then the process 600 proceeds to step 670 and allows the encryption procedure to occur. However, if the PTE encryption monitor bit 410 is enabled, then the process 600 proceeds to step 620.

If the PTE encryption monitor bit 410 is enabled, the encryption monitor 140 determines whether the PTE encryption status bit 420 is set. This is illustrated at step 620. The PTE encryption status bit 420, when set, can indicate to the encryption monitoring system 100 that an encryption operation has been performed on this page table entry and that a pre-encrypted version of the entry has been placed into the backup memory area 300. If the PTE encryption status bit 420 is set, then the process 600 proceeds to step 660. However, if the PTE encryption status bit 420 is not set, then the process 600 proceeds to step 625.

If the PTE encryption status bit 420 of page table entry is not set, then the encryption monitor 140 determines whether the physical page of the page table entry is already stored in backup memory 300. This is illustrated at step 625. The encryption monitor 140 can scan the hash table 340 to determine if a pre-encrypted version of the physical page for the page table entry is currently stored in the data region 355 of the backup memory area 300. The hash table 340 can include a mapping between physical pages and their currently stored locations in the backup memory area 300. If the physical page is already stored in the backup memory area 300, then the process 600 proceeds to step 627. However, if the physical page is not already stored in the backup memory area 300, the process 600 proceeds to step 630.

In some embodiments, the physical page is stored in the backup memory are 300 even though the PTE encryption status bit 420 is not set for a particular PTE. This is possible because a single physical page frame 440 can be mapped from multiple virtual pages (e.g., a concept known as page aliasing). This occurs, for example, when multiple processes map the same filesystem object into their address space. In this scenario, there will be multiple PTEs mapping the same physical page frame 440. The first process that encrypts the filesystem object will cause the physical page contents to be copied into the backup memory area 300 and its PTE encryption status bit 420 is set after the copy is made. For all other processes, the PTE encryption status bit 420 is not set even though the PTE's physical page copy already exists in the backup memory area 300.

If the physical page is already stored in the backup memory area 300 as determined at step 625, then the encryption monitor 140 set the PTE encryption status bit 420. This is illustrated at step 627.

If the physical page is not already stored in the backup memory area 300, then the encryption monitor 140 determines whether there is available space in the data region 355 of the backup memory area 300 to store the physical page. This is illustrated at step 630. The encryption monitor 140 can reference the metadata region 305 of the backup memory area 300 and inspect the available memory 320 information. The available memory 320 can indicate the remaining space available in the data region 355 of the backup memory area 300. If there is no available space to store the physical page, then the encryption monitoring system 100 generates an interrupt indicating that an alleviation measure is required to provide memory space for the physical page. This is illustrated at step 635. However, if space is available, then the encryption monitor 140 stores the physical page in the data region 355 of the backup memory area 300. This is illustrated at step 640.

Additionally, the encryption monitor 140 updates the metadata region 305 of the backup memory area 300. This is illustrated at step 645. The hash table 340 can be updated to add the mapping for the physical page and its corresponding location in the data region 355. The hash table entries 345 can also maintain the encryption count 343 for the physical page frame 440, as depicted in FIG. 3B. The updating step 645 can also set the encryption count 343 to '1'. In some embodiments, this can happen irrespective of the encryption count bit 229 in the encryption monitor register 200. The encryption count bit 229 can determine whether the value of the encryption count 343 goes above the initial value of '1'. In some embodiments, the available space 320 information is also adjusted to reflect the space taken by the physical page once it is placed into the data region. The PTE encryption status bit 420 for the page table entry of the physical page can also be set to indicate that the physical page has been stored and that the page will be encrypted. This is illustrated at step 650.

The encryption monitor determines whether the encryption count bit 229 is set in the encryption monitor register 200. This is illustrated at step 660. The encryption count bit 229 can indicate to the encryption monitoring system 100 to update the encryption count whenever a part of a physical page frame is being encrypted. If the encryption count bit 229 is not set, then the process 600 proceeds to step 670 and the physical page of the page table entry is encrypted.

However, if the encryption count bit 229 is set, the hash table can be updated. This is illustrated at step 655. The hash table update can include incrementing the encryption count 343 stored in the hash table entries 340 and setting the PTE encryption status bit 420 of the page table entry if the PTE encryption status bit 420 has not already been set. The process 600 proceeds to step 670 and the physical page of the page table entry is encrypted.

Figure 7:
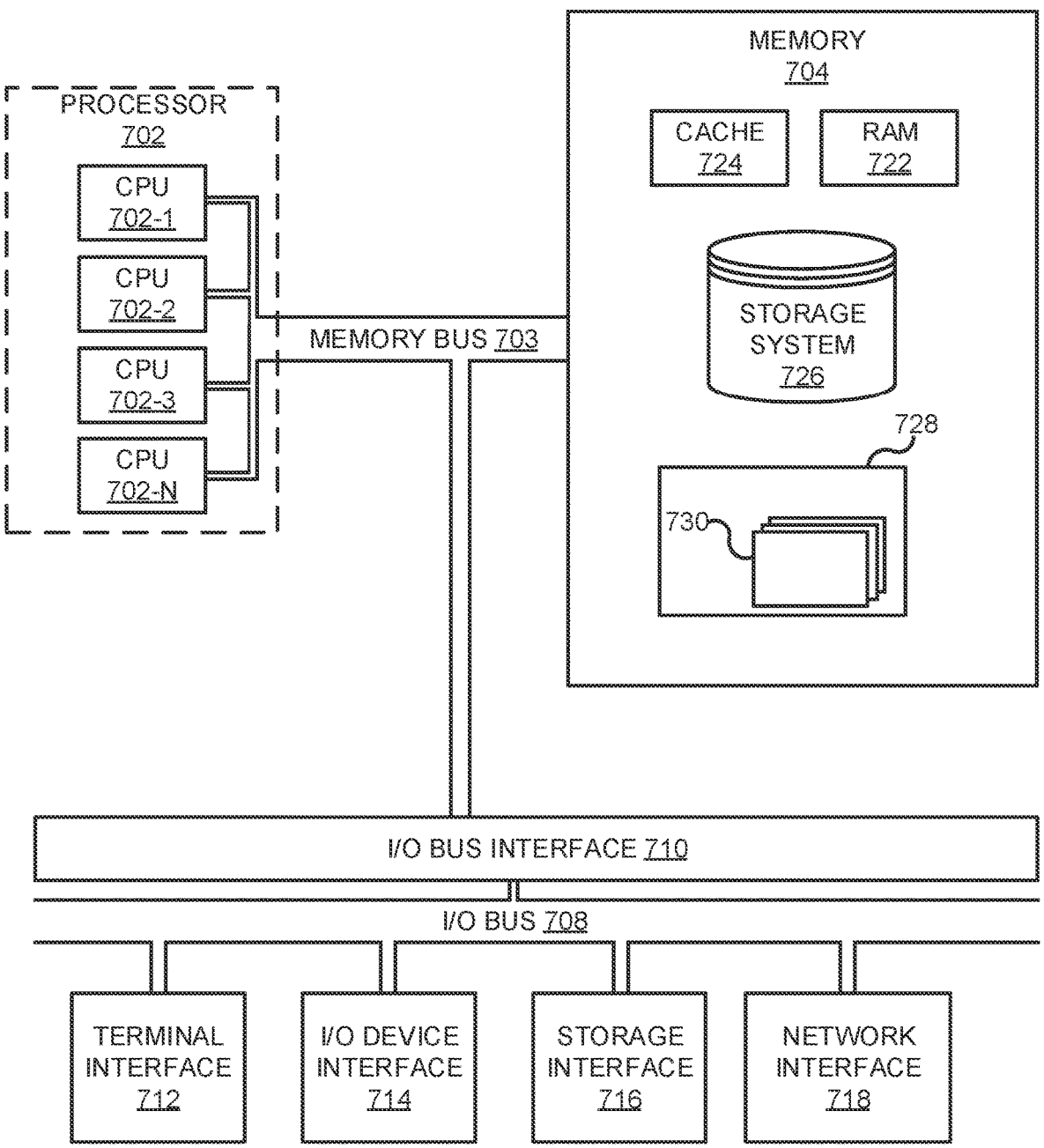
FIG. 7 is a high-level block diagram illustrating an example computer system that may be used in implementing one or more of the methods, tools, and modules, and any related functions, described herein in which the disclosure may be implemented.

Referring now to FIG. 7, shown is a high-level block diagram of an example computer system 700 (e.g., the encryption monitoring system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 700 may comprise one or more processors 702, a memory 704, a terminal interface 712, an I/O (Input/Output) device interface 714, a storage interface 716, and a network interface 718, all of which may be communicatively coupled, directly or indirectly, for inter-component communication via a memory bus 703, an I/O bus 708, and an I/O bus interface 710.

The computer system 700 may contain one or more general-purpose programmable central processing units (CPUs) 702-1, 702-2, 702-3, and 702-N, herein generically referred to as the processor 702. In some embodiments, the computer system 700 may contain multiple processors typical of a relatively large system; however, in other embodiments, the computer system 700 may alternatively be a single CPU system. Each processor 702 may execute instructions stored in the memory 704 and may include one or more levels of onboard cache.

The memory 704 may include computer system readable media in the form of volatile memory, such as random-access memory (RAM) 722 or cache memory 724. Computer system 700 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

Although the memory bus 703 is shown in FIG. 7 as a single bus structure providing a direct communication path among the processors 702, the memory 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 700 may, in some embodiments, contain multiple I/O bus interface units, multiple I/O buses, or both. Further, while multiple I/O interface units are shown, which separate the I/O bus 708 from various communications paths running to the various I/O devices, in other embodiments, some or all of the I/O devices may be connected directly to one or more system I/O buses.

In some embodiments, the computer system 700 may be a multi-user mainframe computer system, a single-user system, or a server computer or similar device that has little or no direct user interface but receives requests from other computer systems (clients). Further, in some embodiments, the computer system 700 may be implemented as a desktop computer, portable computer, laptop or notebook computer, tablet computer, pocket computer, telephone, smartphone, network switches or routers, or any other appropriate type of electronic device.

It is noted that FIG. 7 is intended to depict the major representative components of an exemplary computer system 700. In some embodiments, however, individual components may have greater or lesser complexity than as represented in FIG. 7, components other than or in addition to those shown in FIG. 7 may be present, and the number, type, and configuration of such components may vary.

One or more programs/utilities 728, each having at least one set of program modules 730 (e.g., the encryption monitoring system 100), may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An encryption monitoring system comprising:
   a memory;
   a processor;
   an encryption monitor register including control bits to establish encryption monitoring of filesystem objects for ransomware attacks;
   a hardware page table including encryption monitor bits and encryption status bits for page table entries of the filesystem objects, wherein the encryption monitor bits indicate which filesystem objects require encryption monitoring and the encryption status bits indicate when encryption operations occur to the filesystem objects;
   a backup memory area including a data region for storing pre-encrypted versions of the filesystem objects marked for encryption monitoring; and
   an initializer configured to set the control bits in the encryption monitor register, enable encryption monitoring of the filesystem objects by setting the encryption monitor bits in the hardware page table, and further configured to allocate the backup memory area.

2. The encryption monitoring system of claim 1, wherein the control bits include an encryption monitor bit configured to enable encryption monitoring.

3. The encryption monitoring system of claim 1, wherein the control bits include a backup memory area bit configured to indicate that the pre-encrypted versions are to be stored in the backup memory area.

4. The encryption monitoring system of claim 1, wherein the control bits include an encryption count bit configured to indicate that an encryption count is to be updated whenever a page table entry is encrypted.

5. The encryption monitoring system of claim 1, wherein the encryption monitor register includes data bits to store and calculate a starting address of the backup memory area.

6. The encryption monitoring system of claim 1, wherein the data region of the backup memory area stores pre-encrypted versions of filesystem objects marked for encryption monitoring.

7. The encryption monitoring system of claim 1, wherein the backup memory area includes a metadata region having information that includes a total size of the data region, available memory space remaining in the data region, and a hash table.

8. The encryption monitoring system of claim 7, wherein the hash table includes a mapping between physical page frame numbers relating to the filesystem object and a location of their corresponding pre-encrypted versions stored in the data region.

9. The encryption monitoring system of claim 7, wherein the hash table include an encryption count configured to be updated when a page table entry is being encrypted.

10. The encryption monitoring system of claim 1, wherein the encryption monitor bits of the hardware page table indicate a monitoring status of the page table entries and the encryption status bits indicate an encryption status of the page table entries.

11. A computer-implemented method for initializing and monitoring for unauthorized encryptions, the computer-implemented method comprising:
    configuring an encryption monitor register to establish monitoring preferences of filesystem objects for monitoring for ransomware attacks;
    allocating a predetermined size of persistent memory as a backup memory area for storing pre-encrypted versions of the filesystem objects;
    inserting a starting address of the backup memory area in data bits of the encryption monitor register; and
    setting page table entry (PTE) encryption monitor bits of page table entries in a hardware page table that correspond to at least one filesystem object, thereby establishing encryption monitoring of the filesystem object, wherein the encryption monitor bits indicate which filesystem objects require encryption monitoring.

12. The computer-implemented method of claim 11, further comprising:
    detecting an encryption operation request on the filesystem object;
    determining an encryption configuration of the encryption monitor register;
    determining the backup memory area can store a pre-encrypted version of the filesystem object;
    storing the pre-encrypted version of the filesystem object; and
    updating an encryption count based on the encryption configuration.

13. The computer-implemented method of claim 11, wherein the encryption monitor register includes data bits to store and calculate a starting address of the backup memory area.

14. The computer-implemented method of claim 11, wherein the backup memory area includes a data region configured to store pre-encrypted versions of filesystem objects marked for encryption monitoring.

15. The computer-implemented method of claim 11, wherein the backup memory area includes a metadata region having information that includes a total size of a data region, available memory space remaining in the data region, and a hash table.

16. The computer-implemented method of claim 15, wherein the hash table includes a mapping between the filesystem objects and their corresponding pre-encrypted versions stored in a data region of the backup memory area.

17. The computer-implemented method of claim 15, wherein the hash table include an encryption count configured to be updated when a page table entry is being encrypted.

18. The computer-implemented method of claim 11, wherein encryption monitor bits of the hardware page table indicate a monitoring status of the page table entries and the encryption status bits indicate an encryption status of the page table entries.

19. A computer program product including a computer readable storage medium having computer executable instructions that when executed by at least one computer cause the at least one computer to execute the instructions to:

configure an encryption monitor register to establish monitoring preferences of filesystem objects for monitoring for ransomware attacks;

allocate a predetermined size of persistent memory as a backup memory area for storing pre-encrypted versions of the filesystem objects;

insert a starting address of the backup memory area in data bits of the encryption monitor register; and set page table entry (PTE) encryption monitor bits of page table entries in a hardware page table that correspond to at least one filesystem object, thereby establishing encryption monitoring of the filesystem object, wherein the encryption monitor bits indicate which filesystem objects require encryption monitoring.

20. The computer program product of claim 19, further comprising instructions too:

detect an encryption operation request on the filesystem object;

determine an encryption configuration of the encryption monitor register;

determine the backup memory area can store a pre-encrypted version of the filesystem object;

store the pre-encrypted version of the filesystem object; and update an encryption count based on the encryption configuration.

\* \* \* \* \*